June 11, 1929.   F. P. MILLER   1,716,455
ROTARY CUTTER
Filed Aug. 12, 1926
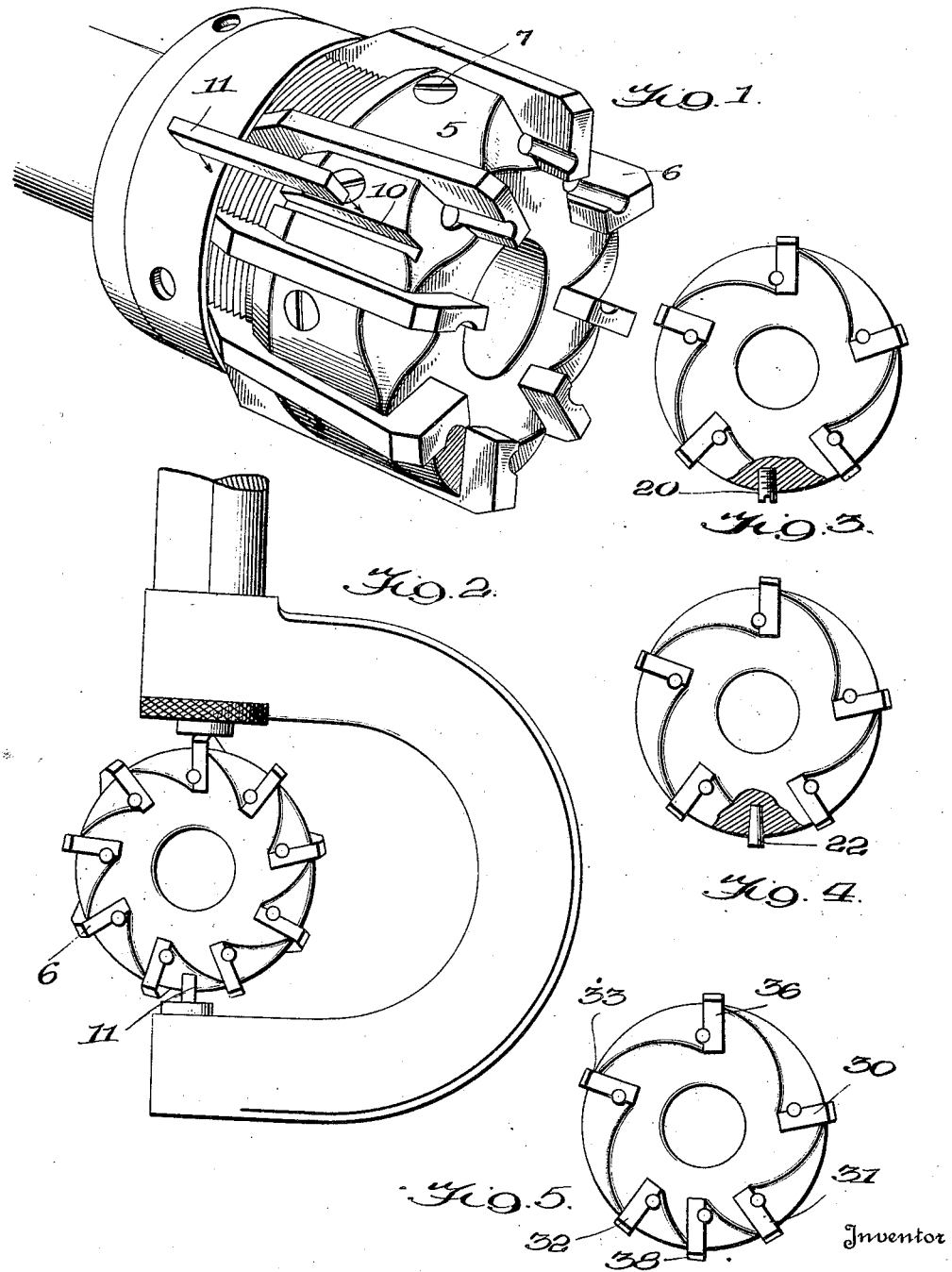
Inventor
FRANK P. MILLER,
By
Quesada
Attorney Patented June 11, 1929.

1,716,455

UNITED STATES PATENT OFFICE.

FRANK P. MILLER, OF MEADVILLE, PENNSYLVANIA.

ROTARY CUTTER.

Application filed August 12, 1926. Serial No. 128,824.

This invention relates to rotary cutters such as reamers and milling cutters.

In all commercially practical inserted blade reamers and the like of which I know, the cutting edge of each blade is diametrically opposite the cutting edge of another blade to make adjustment and measurement a comparatively simple matter, but such an arrangement lacks the steadiness and freedom of chattering obtainable in a reamer in which the blades are spaced about the reamer in such a manner that the majority of the blades are not located opposite other blades.

Therefore, an important object is to provide a rotary cutter in which each cutting blade thereof occupies a plane not occupied by any other blade, whereby chattering is overcome.

Other objects and advantages will be apparent during the course of the following description.

In the accompanying drawing forming a part of this application and in which like numerals are employed to designate like parts throughout the same, Figure 1 is a group perspective illustrating an inserted blade reamer and a strip which may be placed opposite one of the blades during grinding and measurement.

Figure 2 is an end elevation illustrating the manner in which a micrometer measurement may be made when a reamer constructed in accordance with this invention has been ground.

Figure 3 is an end elevation partly in section illustrating a modification of the invention.

Figure 4 is an end elevation partly in section illustrating another embodiment of the invention.

Figure 5 is an end elevation illustrating a further embodiment of the invention.

In the drawing the numeral 5 designates a reamer body which may, as shown in Figures 1 and 2, be provided with a series of longitudinal grooves for the reception of blades 6. Suitable fastening devices such as set screws 7 and means coacting therewith may be employed to securely lock the blades in an adjusted position.

As pointed out in the opening paragraphs of this specification, the commercially practical reamers of which I know, have the blades thereof opposite each other to provide for the accurate measurement of the cutting diameter of the reamer, and this arrangement of the blades results in chattering, and to avoid this, I have provided a reamer in which the majority of the blades occupy planes not occupied by any other blades of the reamer, whereby steadiness and freedom from chattering is made possible.

In carrying out the invention the body 5 may be provided with a longitudinal groove 10 to snugly and detachably receive a strip or insert 11 of a suitable length, the location of the groove 10 being such that the strip 11 is disposed diametrically opposite the cutting edge of one of the blades. Thus when it is desired to measure the cutting diameter of the reamer a micrometer may be engaged with the outer edge of the strip 11 and the blade opposite the strip as suggested in Figure 2.

The insert 11 may be in the nature of a soft, cheap piece of metal and after the grinding and measuring operations may be discarded. Of course, during the grinding of the reamer blades the strip 11 is in place and is worn down with the blades so that it is a simple matter to ascertain the true cutting diameter of the reamer by applying a micrometer to the strip 11 and the blade opposite thereto.

During the grinding operation frictional contact between the strip 11 and the walls of the groove 10 is sufficient to hold the strip 11 in place. Ordinarily the groove 10 is in the diametrically enlarged forward portion of the body and extends out through the ends of this diametrically enlarged portion so that the strip 11 may be struck at either end with a tool and expeditiously removed.

Figure 2 illustrates that a micrometer adjustment may be made quite as easily as a similar adjustment may be made on a reamer in which each blade is opposite another blade.

Figures 1 and 2 illustrate that some or all of the blades may be extended angularly. In other words, one blade could be set at a righthand angle, the next blade at a lefthand angle and the next blade parallel with the axis of the reamer and this arrangement continued about the circumference of the reamer.

In the form of invention illustrated in Figure 3 the insert or filler may be in the nature of a threaded pin 20, which is threaded into a socket at a point diametrically opposite one of the blades and flatly engages with the bottom wall of the socket. Any suitable tool engaging means such as a slot in the screw may be employed for either applying or removing the screw. If desired, a shorter screw may be employed to merely fill the socket during the use of the reamer. This will prevent the accumulation of cuttings in the socket.

In the form of invention illustrated in Figure 4, the insert or filler is in the nature of a tapered pin or plug 22 which is detachably received in a tapered socket located at a point diametrically opposite the cutting edge of one of the blades. After the grinding and measurement of the reamer the tapered pin or plug 22 may be thrown away and a new pin employed when the reamer is to be again ground or the cutting diameter of the reamer measured.

Figure 5 illustrates still another form of the invention and by reference to this figure it will be seen that each of the blades, 30, 31, 32 and 33 occupy their own separate planes and that there are no cutting blades diametrically opposite them.

The numerals 36 and 38 designate cutting blades which not only function as such but which provide a means whereby the cutting diameter of the reamer may be readily measured, since these blades have their cutting edges diametrically opposite each other for use in the normal operation of the reamer and for use in the measurement of the cutting diameter of the reamer.

The foregoing illustrates that the invention forming the subject matter of this application is capable of a wide variety of mechanical expressions and it is, therefore, to be understood that the forms of invention herewith shown and described are to be taken merely as preferred examples of the same and that such minor changes in arrangement and construction of parts may be made as will remain within the spirit of the invention and the scope of what is claimed.

Having thus described the invention, what is claimed is:

1. A rotary cutter comprising a body having a plurality of blades arranged at such angular intervals that the blades do not come diametrically opposite, said body being provided, at a point opposite one of said blades, with a groove, and a metal plate seated within said groove cooperating with the opposite blade to afford means for engagement by a diameter gage, said plate being grindable with said blades, to a given cutting diameter of said cutter, said plate being discardable without prejudice to the centering function of said cutter.

2. A rotary cutter comprising a body having a plurality of blades arranged at such angular intervals that the blades do not come diametrically opposite, said body being provided, at a point opposite one of said blades with a groove, and a metal plate frictionally held within said groove cooperating with the opposite blade to afford means for engagement by a diameter gage, said plate being grindable with said blades to a given cutting diameter of said cutter, said groove being open at the ends to expedite removal of said plate, the latter being discardable without prejudice to the centering function of said cutter.

In testimony whereof I affix my signature.

FRANK P. MILLER.